United States Patent
Ikeuchi

(10) Patent No.: US 10,644,333 B2
(45) Date of Patent: May 5, 2020

(54) REDOX FLOW BATTERY

(71) Applicant: Sumitomo Electric Industries, Ltd., Osaka-shi (JP)

(72) Inventor: Atsuo Ikeuchi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 121 days.

(21) Appl. No.: 16/080,427

(22) PCT Filed: Nov. 28, 2017

(86) PCT No.: PCT/JP2017/042651
§ 371 (c)(1),
(2) Date: Aug. 28, 2018

(87) PCT Pub. No.: WO2019/106722
PCT Pub. Date: Jun. 6, 2019

(65) Prior Publication Data
US 2019/0237783 A1   Aug. 1, 2019

(51) Int. Cl.
*H01M 8/04186*   (2016.01)
*H01M 8/18*   (2006.01)
(Continued)

(52) U.S. Cl.
CPC ......... *H01M 8/04186* (2013.01); *H01M 8/00* (2013.01); *H01M 8/04* (2013.01);
(Continued)

(58) Field of Classification Search
CPC ...... H01M 8/00; H01M 8/04; H01M 8/04186; H01M 8/04201; H01M 8/04276;
(Continued)

(56) References Cited

U.S. PATENT DOCUMENTS

| | | | |
|---|---|---|---|
| 2012/0308867 A1* | 12/2012 | Winter | H01M 8/20 429/101 |
| 2013/0045399 A1* | 2/2013 | Cole | H01M 8/188 429/51 |
| 2013/0302710 A1* | 11/2013 | Boersma | H01M 8/0273 429/429 |

FOREIGN PATENT DOCUMENTS

JP   2012-164530 A   8/2012

* cited by examiner

*Primary Examiner* — Carlos Barcena
(74) *Attorney, Agent, or Firm* — Baker Botts, L.L.P.; Michael A. Sartori

(57) ABSTRACT

A redox flow battery includes a cell, an electrolyte tank, and a circulation mechanism. The circulation mechanism includes a suction pipe, a circulation pump, an extrusion, and a return pipe. An absolute value of a difference between $H_{L1}$ and $H_{L2}$ is greater than or equal to 0.4 times $H_0$ and both $H_{L1}$ and $H_{L2}$ are less than or equal to $H_d$, where $H_0$ is a height from an inner bottom surface of the electrolyte tank to the in-tank liquid level, $H_{L1}$ is a length from the in-tank liquid level to the open end of the suction pipe, $H_{L2}$ is a length from an in-tank liquid level to an open end of the return pipe, and $H_d$ is a distance from the in-tank liquid level to a center of a highest segment of the return pipe.

5 Claims, 6 Drawing Sheets

(51) Int. Cl.
*H01M 8/04082* (2016.01)
*H01M 8/04746* (2016.01)
*H01M 8/04* (2016.01)
*H01M 8/00* (2016.01)

(52) U.S. Cl.
CPC ... *H01M 8/04201* (2013.01); *H01M 8/04753* (2013.01); *H01M 8/18* (2013.01); *H01M 8/188* (2013.01)

(58) Field of Classification Search
CPC ......... H01M 8/04746; H01M 8/04753; H01M 8/18; H01M 8/188
See application file for complete search history.

REDOX FLOW BATTERY

TECHNICAL FIELD

The present invention relates to a redox flow battery.

BACKGROUND ART

Patent Literature (PTL) 1 discloses a redox flow battery that includes a cell configured to perform charge and discharge between itself and a power system, an electrolyte tank configured to store an electrolyte supplied to the cell, and a circulation mechanism disposed between the cell and the electrolyte tank and configured to circulate the electrolyte. The circulation mechanism includes a circulation pump, a pipe running from the electrolyte tank to the circulation pump, a pipe running from the circulation pump to the cell, and a pipe running from the cell to the electrolyte tank. The circulation pump is disposed to a side of the electrolyte tank.

CITATION LIST

Patent Literature

PTL 1: Japanese Unexamined Patent Application Publication No. 2012-164530

SUMMARY OF INVENTION

A redox flow battery according to the present disclosure includes a cell, an electrolyte tank configured to store an electrolyte supplied to the cell, and a circulation mechanism disposed between the cell and the electrolyte tank and configured to circulate the electrolyte. The circulation mechanism includes a suction pipe configured to suck up the electrolyte from an open end thereof in the electrolyte to above an in-tank liquid level of the electrolyte in the electrolyte tank, a circulation pump disposed at an end portion of the suction pipe, an extrusion pipe running from a discharge port of the circulation pump to the cell, and a return pipe running from the cell to the electrolyte tank. An absolute value of a difference between $H_{L1}$ and $H_{L2}$ is greater than or equal to 0.4 times $H_0$ and both $H_{L1}$ and $H_{L2}$ are less than or equal to $H_d$, where $H_0$ is a height from an inner bottom surface of the electrolyte tank to the in-tank liquid level, $H_{L1}$ is a length from the in-tank liquid level to the open end of the suction pipe, $H_{L2}$ is a length from the in-tank liquid level to an open end of the return pipe in a depth direction of the electrolyte, and $H_d$ is a distance from the in-tank liquid level to a center of a highest segment of the return pipe, the highest segment being located at the highest level of the return pipe. If the open end of the return pipe is located above the in-tank liquid level, the difference between $H_{L1}$ and $H_{L2}$ is $H_{L1}$.

DESCRIPTION OF EMBODIMENTS

Figure 1:
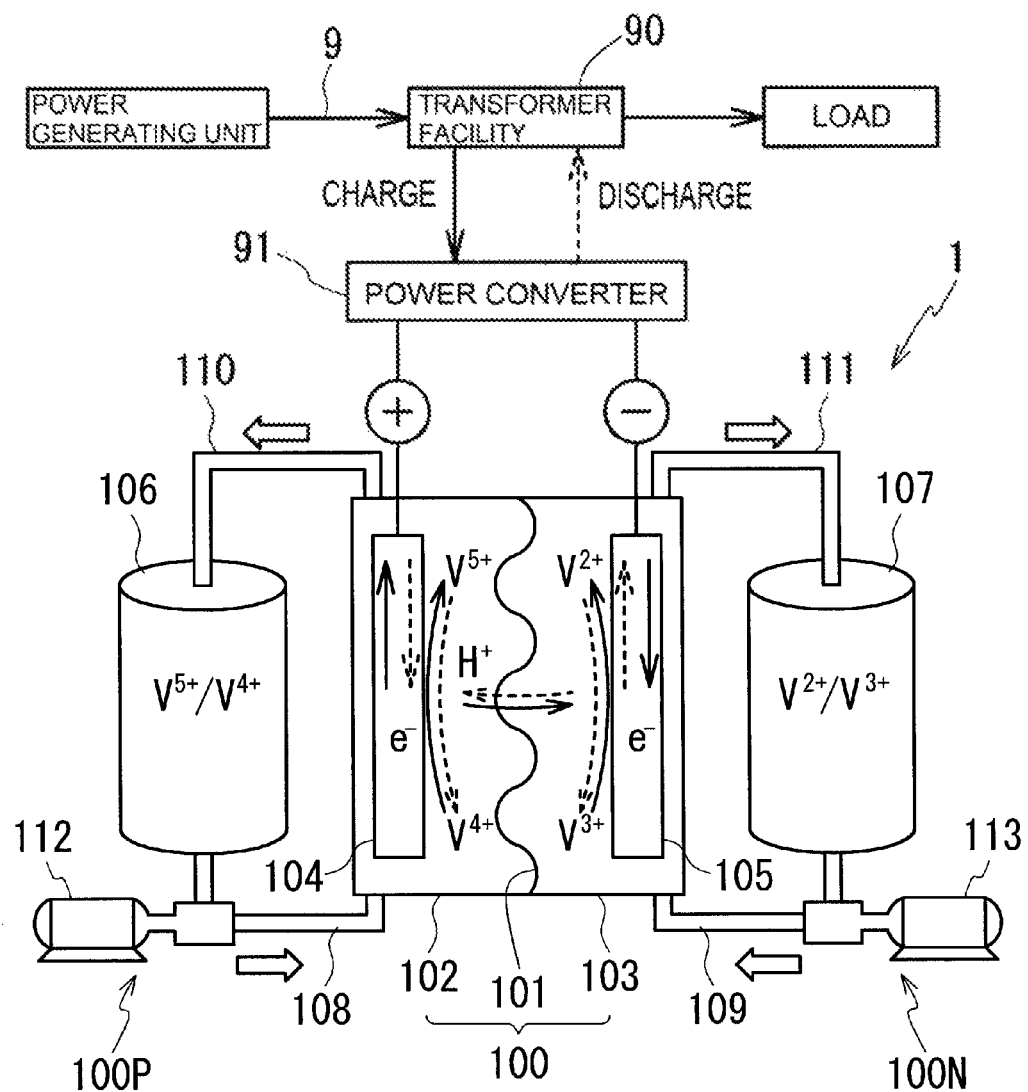
FIG. 1 illustrates a working principle of a redox flow battery.

Problems to be Solved by the Present Disclosure

In conventional redox flow batteries, a circulation pump is disposed to a side of an electrolyte tank to circulate an electrolyte in a cell. This means that if a pipe running from the electrolyte tank to the circulation pump is damaged, most of the electrolyte in the electrolyte tank may leak out.

Accordingly, an object of the present disclosure is to provide a redox flow battery that can prevent the electrolyte from leaking out of the electrolyte tank even if the pipe running from the electrolyte tank to the circulation pump is damaged.

Description of Embodiments of the Invention of the Present Application

In view of the problem described above, the present inventors have studied a configuration for sucking up the electrolyte to above the electrolyte tank. The configuration that sucks up the electrolyte tends to increase a suction height (also referred to as an actual suction head) by which the electrolyte is sucked up to the circulation pump and a height (actual push-up head) by which the electrolyte is pushed up from the circulation pump. As the sum of the actual suction head and the actual push-up head increases, the pump power of the circulation pump needs to be increased.

For the redox flow battery, it is also necessary to take into account the utilization ratio of the electrolyte in the electrolyte tank. The redox flow battery performs charge and discharge using changes in the valence of active material ions contained in the electrolyte. Therefore, if the height of the open end of the suction pipe for sucking up the electrolyte is equal to the height of the open end of the return pipe for returning the electrolyte back to the electrolyte tank, convection of the electrolyte is less likely to develop and this makes it difficult to effectively use active materials in the electrolyte tank. To increase the utilization ratio of the electrolyte, convection of the electrolyte in the electrolyte tank may be promoted by creating a difference between the height of the open end of the suction pipe and the height of the open end of the return pipe. However, as the lengths of the suction pipe and the return pipe increase, pressure loss associated with friction between the pipes and the electrolyte increases and this leads to increased pump power required for the circulation pump.

The present inventors have further studied the configuration for sucking up the electrolyte and have found out that by defining the relationship between the actual head and the lengths of the suction pipe and the return pipe, it is possible to reduce the size of the circulation pump included in the circulation mechanism and reduce power consumption required for operating the redox flow battery. Embodiments of the invention of the present application are listed and described below.

<1> A redox flow battery according to an embodiment includes a cell, an electrolyte tank configured to store an electrolyte supplied to the cell, and a circulation mechanism disposed between the cell and the electrolyte tank and configured to circulate the electrolyte. The circulation mechanism includes a suction pipe configured to suck up the electrolyte from an open end thereof in the electrolyte to above an in-tank liquid level of the electrolyte in the electrolyte tank, a circulation pump disposed at an end portion of the suction pipe, an extrusion pipe running from a discharge port of the circulation pump to the cell, and a return pipe running from the cell to the electrolyte tank. An absolute value of a difference between $H_{L1}$ and $H_{L2}$ is greater than or equal to 0.4 times $H_0$ and both $H_{L1}$ and $H_{L2}$ are less than or equal to $H_d$, where $H_0$ is a height from an inner bottom surface of the electrolyte tank to the in-tank liquid level, $H_{L1}$ is a length from the in-tank liquid level to the open end of the suction pipe, $H_{L2}$ is a length from the in-tank liquid level to an open end of the return pipe in a depth direction of the electrolyte, and $H_d$ is a distance from the in-tank liquid level to a center of a highest segment of the return pipe, the highest segment being located at the highest level of the return pipe. If the open end of the return pipe is located above the in-tank liquid level, the difference between $H_{L1}$ and $H_{L2}$ is $H_{L1}$.

When the electrolyte is circulated from the electrolyte tank to the cell, the electrolyte is sucked up to above the in-tank liquid level. With this configuration, even if the suction pipe running from the electrolyte tank to the circulation pump is damaged, the electrolyte is less likely to leak out of the electrolyte tank. This is because damage to the suction pipe breaks hermeticity of the suction pipe and allows gravity to cause the electrolyte in the suction pipe to return to the electrolyte tank.

When the difference between $H_{L1}$ and $H_{L2}$ is small, convection of the electrolyte in the electrolyte tank is less likely to develop and the electrolyte in the electrolyte tank is not fully utilized. As a result, even when the electrolyte tank has a larger capacity, it is difficult to achieve the effect of improving the hour-rate capacity of the redox flow battery. On the other hand, when the difference between $H_{L1}$ and $H_{L2}$ is greater than or equal to 0.4 times $H_0$, that is, when $|H_{L1}-H_{L2}|\geq 0.4H_0$ is satisfied, the distance from the open end of the return pipe to the open end of the suction pipe is long. This facilitates development of large convection in the electrolyte and improves the utilization ratio of the electrolyte in the electrolyte tank. Note that if the open end of the return pipe is located above the in-tank liquid level, $H_{L2}$ is defined as zero ($H_{L2}=0$) and this gives $H_{L1}\geq 0.4H_0$.

As described above, the configuration that sucks up the electrolyte tends to increase the distance $H_d$ from the in-tank liquid level to the center of the highest segment of the return pipe located at the highest level, and this leads to increased pump power of the circulation pump. To reduce an increase in pump power, it is important to reduce friction loss in the suction pipe and the return pipe without reducing the utilization ratio of the electrolyte. Specifically, by making both $H_{L1}$ and $H_{L2}$ less than or equal to $H_d$, the pump power of the circulation pump for sucking up and circulating the electrolyte can be kept low. This makes it possible to reduce power consumption for operating the redox flow battery and achieve efficient operation of the redox flow battery.

<2> In an aspect of the redox flow battery according to the embodiment, $H_S$ may be less than or equal to 0.4 times $H_d$, where $H_S$ is a height from the in-tank liquid level to a center of a suction port of the circulation pump.

To suck up the electrolyte, it is necessary to consider a net positive suction head required (NPSHr) for the circulation pump and a net positive suction head available (NPSHa) which takes into account suction conditions. NPSHr is a value obtained by converting a minimum suction pressure required to avoid a decrease in pump efficiency caused by cavitation, into an electrolyte level (height) (m). NPSHr is a pump-specific value independent of liquid property or the like. In contrast, NPSHa is a head which takes into account suction conditions. NPSHa is a value which represents a margin against cavitation during suction of the electrolyte and can be determined by the following equation. To avoid the cavitation, NPSHr<NPSHa needs to be satisfied:

$$\text{NPSHa}(m)=[(P_A-P_V)\times 10^6/p\cdot g]-H_S-H_{fs}$$

where $P_A$ is absolute pressure (MPa) applied at the in-tank liquid level in the electrolyte tank;

$P_V$ is the vapor pressure (MPa) of electrolyte corresponding to temperature at the suction port of the circulation pump;

p is electrolyte density (kg/m$^3$);

g is acceleration of gravity (9.8 m/s$^2$);

$H_S$ is height (m) from the in-tank liquid level in the electrolyte tank to the center of the suction port of the circulation pump; and $H_{fs}$ is head loss (m) in the suction pipe.

Note that $H_{fs}$ can be determined, for example, by the Darcy-Weisbach equation described below:

$$\text{head loss } h(m)=\alpha\cdot\lambda\cdot(L/d)\cdot(v^2/2g)$$

where $\alpha$ is safety factor (e.g., 1.3);

$\lambda$ is the coefficient of pipe friction;

L is pipe length or its equivalent length (m);

d is pipe inside diameter (m); and v is electrolyte flow rate (m/s).

As expressed by the derivation equation described above, NPSHa has a physical limitation and NPSHr<NPSHa may not be satisfied if $H_S$ (actual suction head) is too high. Therefore, it is preferable that the ratio of the actual suction head $H_S$ to the actual head $H_d$ be less than or equal to 40%.

<3> In another aspect of the redox flow battery according to the embodiment, the circulation pump may be a self-priming pump having a pump body including an impeller and a driving unit configured to rotate the impeller, and the pump body may be disposed above the in-tank liquid level.

The configuration described above facilitates maintenance of the circulation pump. This is because by stopping the circulation pump for maintenance of the circulation pump, the electrolyte in the suction pipe is returned to the electrolyte tank and this saves the trouble of taking the impeller out of the electrolyte. Depending on the type of circulation pump, however, the impeller may be disposed in the electrolyte while the driving unit is disposed above the in-tank liquid level of the electrolyte. Maintenance of such a circulation pump involves the trouble of taking the impeller out of the electrolyte. The electrolyte may spatter when the impeller is taken out.

<4> In an aspect of the redox flow battery according to the embodiment in which the pump body is disposed above the in-tank liquid level, the circulation pump may be provided with a priming tank disposed between the pump body and the suction pipe.

In the configuration with the priming tank, sucking the electrolyte in the priming tank with the circulation pump reduces gas-phase pressure in the priming tank and causes the electrolyte in the electrolyte tank to be sucked up into the priming tank. With this configuration, initial suction of the electrolyte stored in the electrolyte tank only involves pouring the electrolyte into the priming tank and operating the circulation pump. The initial suction operation is thus carried out easily. In the configuration without the priming tank, the electrolyte cannot be sucked up until completion of preparation which involves the trouble of filling the circulation pump and the suction pipe with the electrolyte.

<5> In another aspect of the redox flow battery according to the embodiment in which the pump body is disposed above the in-tank liquid level, the redox flow battery may include a cell chamber disposed on an upper surface of the electrolyte tank and containing the cell therein, and the pump body may be disposed in the cell chamber.

With this configuration, even if the electrolyte leaks near the pump body, the leaked electrolyte can be easily kept inside the cell chamber. This facilitates treatment of the leaked electrolyte and improves safety of the treatment.

Details of Embodiments of the Invention of the Present Application

Embodiments of a redox flow battery according to the present disclosure will now be described. Note that the invention of the present application is not limited to the configurations described in the embodiments and is defined by the claims. All changes that fall within meanings and scopes equivalent to the claims are therefore intended to be embraced by the claims.

First Embodiment

Before description of a redox flow battery according to an embodiment, a basic configuration of a redox flow battery (hereinafter referred to as an RF battery 1) will be described on the basis of FIGS. 1 to 3.

<<Basic Configuration of RF Battery>>

An RF battery is an electrolyte-circulating storage battery used, for example, to store electricity generated by new energy, such as solar photovoltaic energy or wind energy. A working principle of the RF battery 1 is described on the basis of FIG. 1. The RF battery 1 is a battery that performs charge and discharge using a difference between the oxidation-reduction potential of active material ions (vanadium ions in FIG. 1) contained in a positive electrolyte and the oxidation-reduction potential of active material ions (vanadium ions in FIG. 1) contained in a negative electrolyte. The RF battery 1 is connected through a power converter 91 to a transformer facility 90 in a power system 9 and performs charge and discharge between itself and the power system 9. When the power system 9 is a power system that performs alternating-current power transmission, the power converter 91 is an alternating current/direct current converter. When the power system is a power system that performs direct-current power transmission, the power converter 91 is a direct current/direct current converter. The RF battery 1 includes a cell 100 divided into a positive electrode cell 102 and a negative electrode cell 103 by a membrane 101 that allows hydrogen ions to pass therethrough.

The positive electrode cell 102 includes a positive electrode 104. A positive electrolyte tank 106 that stores a positive electrolyte is connected through ducts 108 and 110 to the positive electrode cell 102. The duct 108 is provided with a circulation pump 112. These components 106, 108, 110, and 112 form a positive electrolyte circulation mechanism 100P that circulates the positive electrolyte. Similarly, the negative electrode cell 103 includes a negative electrode 105. A negative electrolyte tank 107 that stores a negative electrolyte is connected through ducts 109 and 111 to the negative electrode cell 103. The duct 109 is provided with a circulation pump 113. These components 107, 109, 111, and 113 form a negative electrolyte circulation mechanism 100N that circulates the negative electrolyte. During charge and discharge, the electrolytes stored in the electrolyte tanks 106 and 107 are circulated in the cells 102 and 103 by the circulation pumps 112 and 113. When no charge or discharge takes place, the circulation pumps 112 and 113 are at rest and the electrolytes do not circulate.

[Cell Stack]

Figure 2:
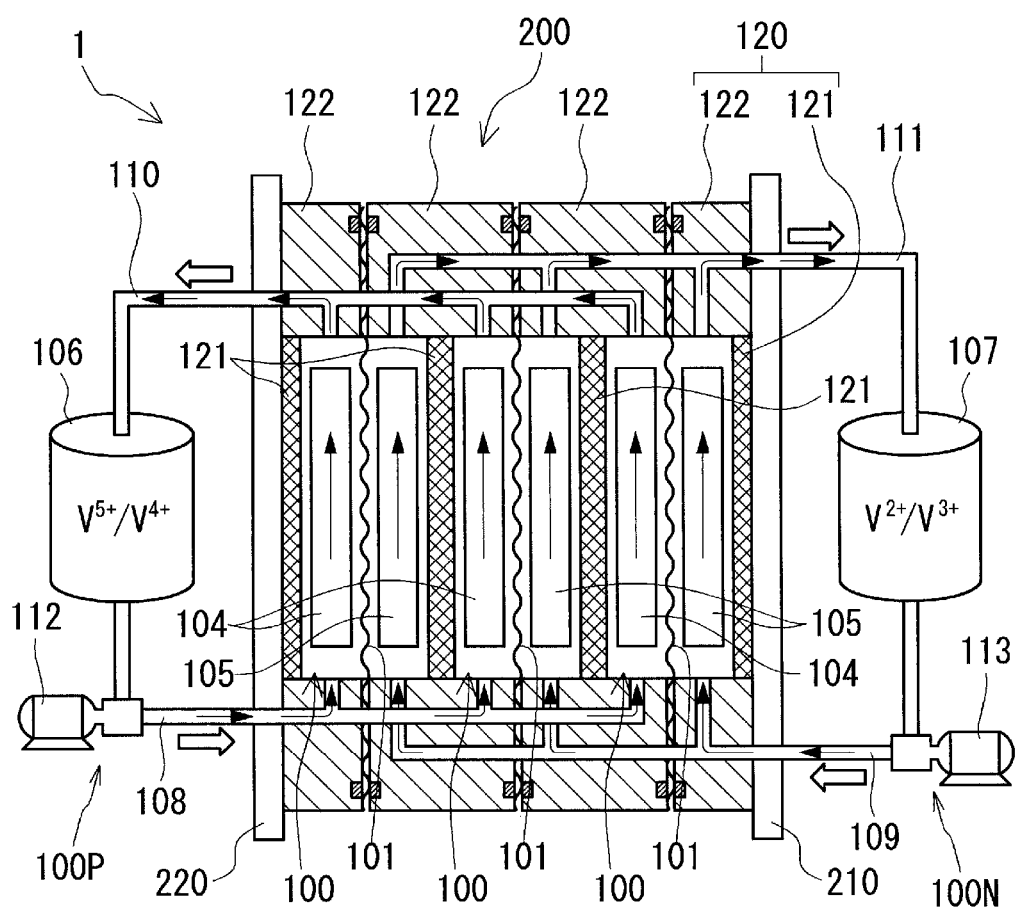
FIG. 2 is a schematic diagram of the redox flow battery.
Figure 3:
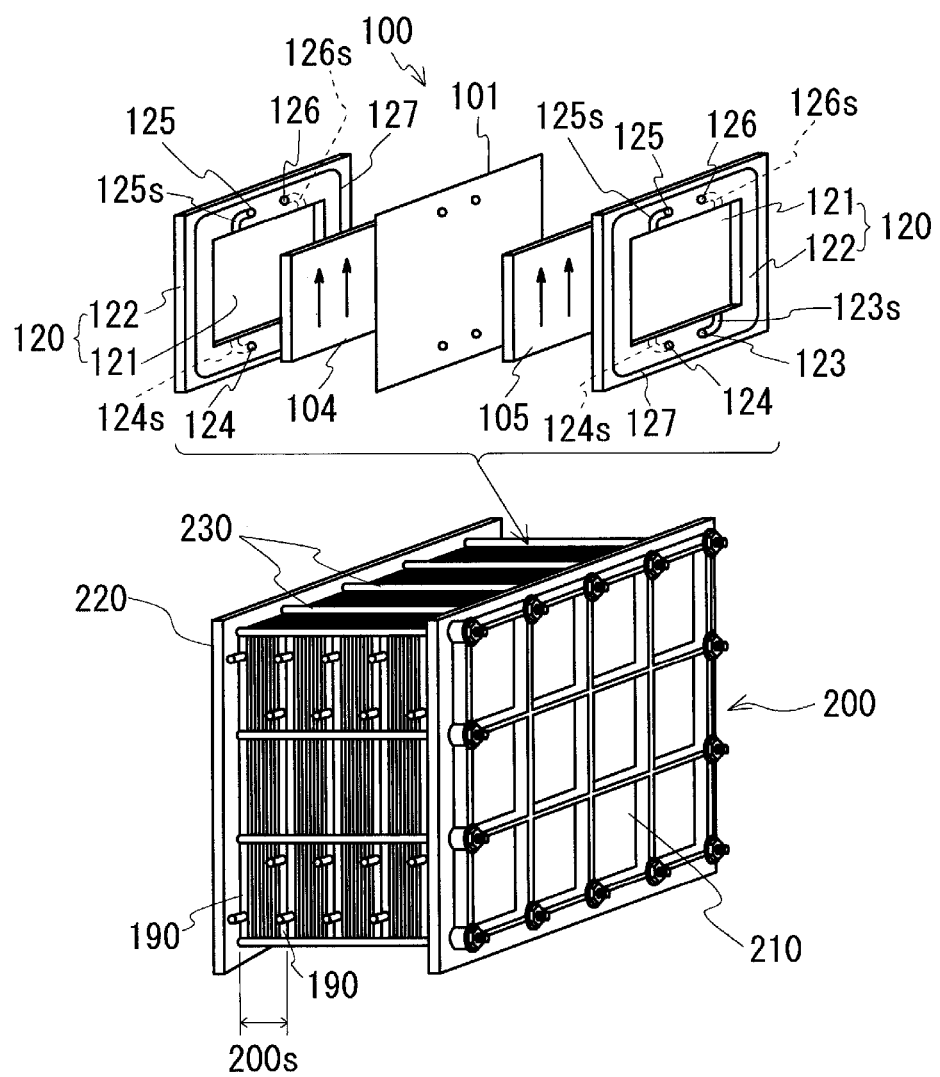
FIG. 3 is a schematic diagram of a cell stack.

The cell 100 is typically formed inside a structure called a cell stack 200, such as that illustrated in FIGS. 2 and 3. The cell stack 200 is formed by sandwiching a layered structure called a substack 200s (see FIG. 3) with two end plates 210 and 220 on both sides, and then fastening the resulting structure with a fastening mechanism 230. The configuration illustrated in FIG. 3 uses more than one substack 200s.

The substack 200s (see FIG. 3) is formed by stacking a plurality of sets of a cell frame 120, the positive electrode 104, the membrane 101, and the negative electrode 105 in layers and sandwiching the resulting layered body between supply/discharge plates 190 (see the lower part of FIG. 3; not shown in FIG. 2).

The cell frame 120 includes a frame body 122 having a through-window and a bipolar plate 121 configured to close the through-window. That is, the frame body 122 supports the outer periphery of the bipolar plate 121. The cell frame 120 can be made, for example, by forming the frame body 122 in such a manner that it is integral with the outer periphery of the bipolar plate 121. Alternatively, the cell frame 120 may be made by preparing the frame body 122 having a thin portion along the outer edge of the through-window and the bipolar plate 121 produced independent of the frame body 122, and then fitting the outer periphery of the bipolar plate 121 into the thin portion of the frame body 122. The positive electrode 104 is disposed in such a manner as to be in contact with one side of the bipolar plate 121 of the cell frame 120, and the negative electrode 105 is disposed in such a manner as to be in contact with the other side of the bipolar plate 121. In this configuration, one cell 100 is formed between the bipolar plates 121 fitted into adjacent cell frames 120.

The circulation of the electrolyte into the cell 100 through the supply/discharge plates 190 (see FIG. 3) is made by liquid supply manifolds 123 and 124 and liquid discharge manifolds 125 and 126 formed in each cell frame 120. The positive electrolyte is supplied from the liquid supply manifold 123 through an inlet slit 123s (see a curved portion indicated by a solid line) formed on one side of the cell frame 120 (i.e., on the front side of the drawing) to the positive electrode 104, and discharged through an outlet slit 125s (see a curved portion indicated by a solid line) formed in the upper part of the cell frame 120 into the liquid discharge manifold 125. Similarly, the negative electrolyte is supplied from the liquid supply manifold 124 through an inlet slit 124s (see a curved portion indicated by a broken line) formed on the other side of the cell frame 120 (i.e., on the back side of the drawing) to the negative electrode 105, and discharged through an outlet slit 126s (see a curved portion indicated by a broken line) formed in the upper part of the cell frame 120 into the liquid discharge manifold 126. A ring-shaped sealing member 127, such as an O-ring or flat gasket, is provided between adjacent cell frames 120, and this prevents leakage of the electrolyte from the substack 200s.

[Electrolyte]

An electrolyte may contain vanadium ions as positive and negative active materials, or may contain manganese and titanium ions as positive and negative active materials, respectively. Other electrolytes of known composition may also be used.

<<RF Battery According to Embodiments>>

Figure 4:
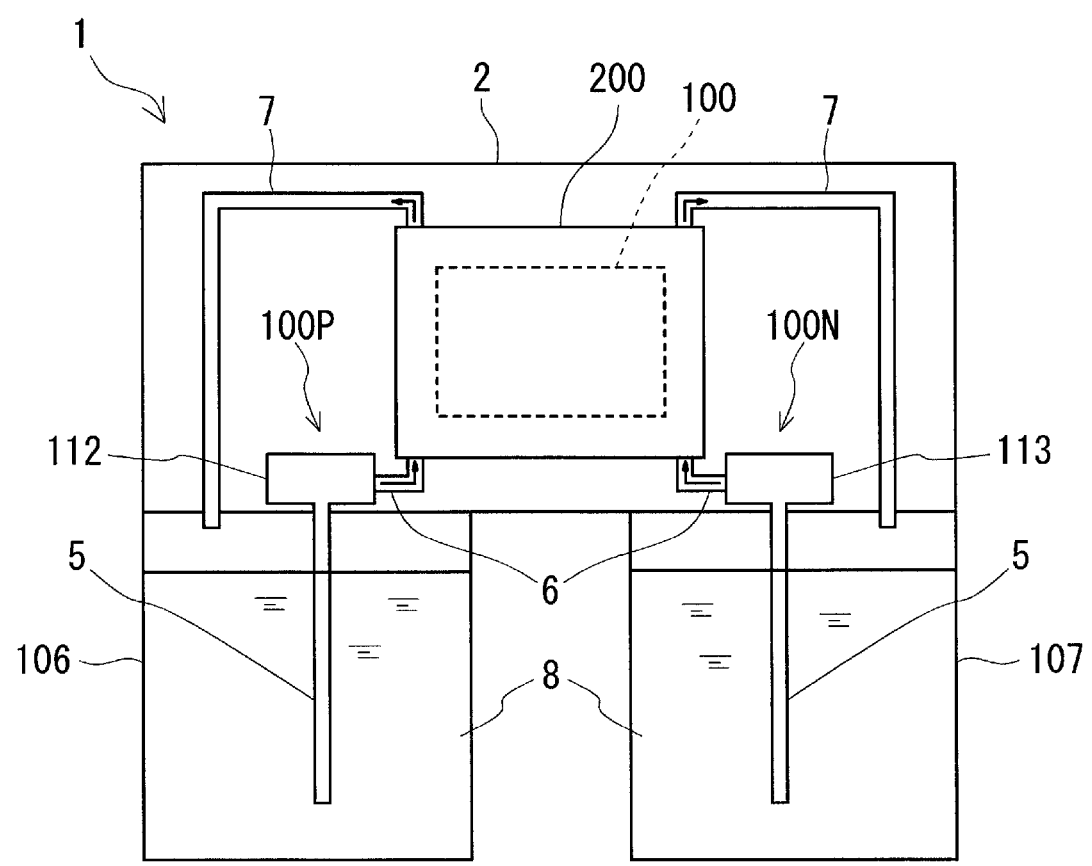
FIG. 4 is a schematic diagram of a redox flow battery according to a first embodiment.
Figure 5:
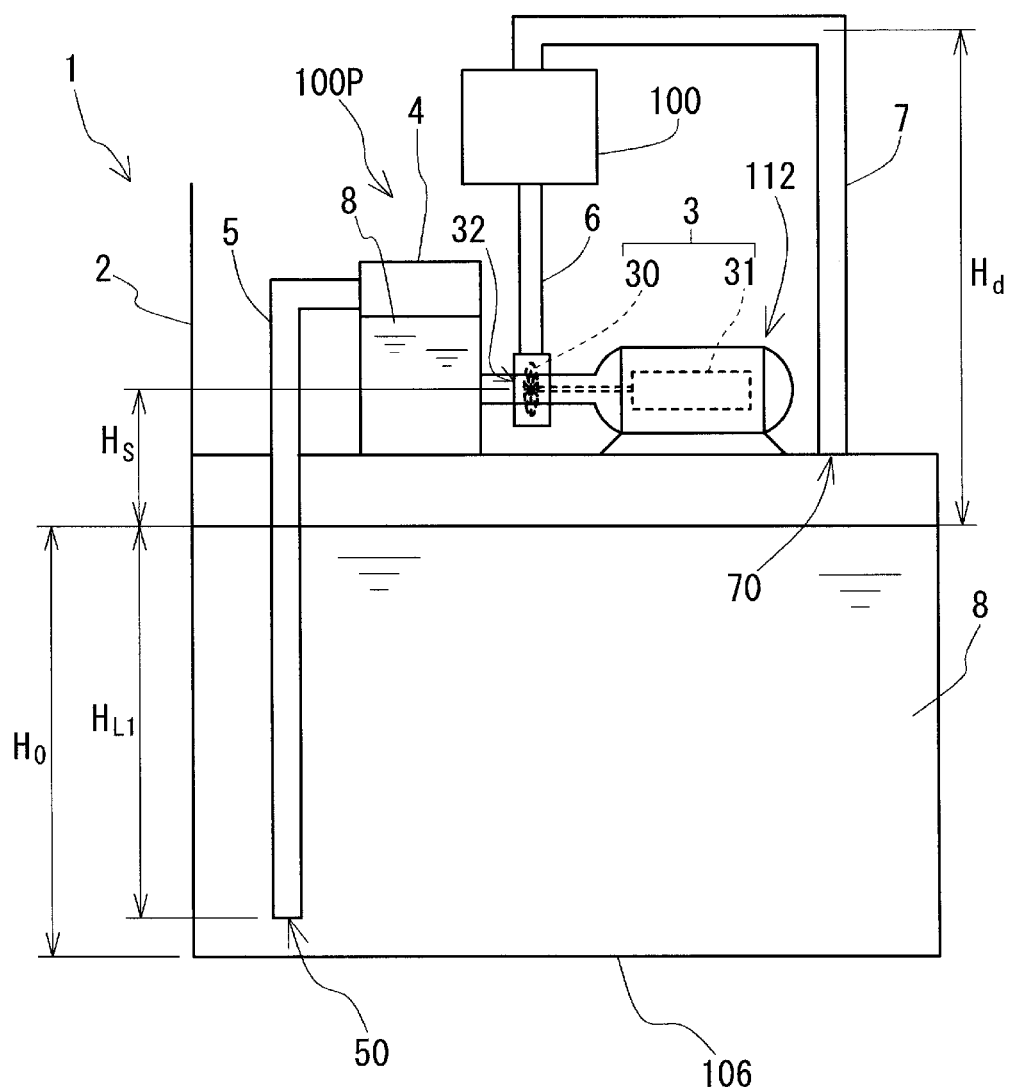
FIG. 5 is a schematic diagram of a circulation mechanism included in the redox flow battery according to the first embodiment.

On the basis of the basic configuration of the RF battery 1 described above, the RF battery 1 according to an embodiment will be described on the basis of FIGS. 4 and 5. FIG. 4 is a schematic diagram of the RF battery 1, and FIG. 5 is a schematic diagram illustrating the positive electrolyte circulation mechanism 100P and its neighboring region of the RF battery 1.

As illustrated in FIG. 4, the components of the RF battery 1 of the present example are in three sections. The first section is a cell chamber 2 that contains therein the cell stack 200 including the cell 100 and the circulation mechanisms 100P and 100N. In the present example, the cell chamber 2 is formed by a container. The second section is a positive tank container serving as the positive electrolyte tank 106. The third section is a negative tank container serving as the negative electrolyte tank 107. In the present example, the container forming the cell chamber 2 is disposed to extend over both the tank containers.

As containers forming the cell chamber 2 and the electrolyte tanks 106 and 107, standard containers, such as maritime containers, can be used. Container sizes may be appropriately selected in accordance with the capacity or output of the RF battery 1. For example, when the RF battery 1 has a large (or small) capacity, the electrolyte tanks 106 and 107 may be formed by large (or small) containers. Examples of the containers include international freight containers compliant with the ISO standard (e.g., ISO 1496-1 (2013)). Typically, 20-foot containers and 40-foot containers, and 20-foot high-cube containers and 40-foot high-cube containers greater in height than the 20-foot and 40-foot containers, can be used.

In the configuration illustrated in FIG. 4, the circulation mechanism 100P (100N) includes a suction pipe 5, the circulation pump 112 (113), an extrusion pipe 6, and the return pipe 7. The suction pipe 5 is a pipe that is positioned, at an open end thereof, in an electrolyte 8 and sucks up the electrolyte 8 to above the electrolyte tank 106 (107). The extrusion pipe 6 is a pipe that runs from the discharge port of the circulation pump 112 (113) to the cell 100. The extrusion pipe 6 may correspond to the duct 108 (109) illustrated in FIG. 1. The return pipe 7 is a pipe that runs from the cell 100 to the electrolyte tank 106 (107). The return pipe 7 may correspond to the duct 110 (111) illustrated in FIG. 1. The return pipe 7 of the present example is open to the gas phase in the electrolyte tank 106 (107). The return pipe 7 is preferably spaced from the suction pipe 5 in the planar direction along the liquid surface in the tank. For example, the return pipe 7 and the suction pipe 5 are preferably arranged diagonally opposite each other. This is because making the pipes 5 and 7 spaced apart can promote convection of the electrolyte. The return pipe 7 is preferably spaced from the suction pipe 5 in the planar direction along the liquid surface in the tank. For example, the return pipe 7 and the suction pipe 5 are preferably arranged symmetrically with respect to the center of the liquid surface in the tank. This is because making the pipes 5 and 7 spaced apart can promote convection of the electrolyte.

As illustrated in FIG. 5, the circulation pump 112 is a self-priming pump having a pump body 3 including an impeller 30 and a driving unit 31 that rotates the impeller 30. The pump body 3 is disposed in the cell chamber 2 and is not immersed in the electrolyte 8. The circulation pump 113 illustrated in FIG. 4 has the same configuration as the circulation pump 112 illustrated in FIG. 5.

The circulation pump 112 is provided with a priming tank 4 disposed between the pump body 3 and the suction pipe 5.

In the configuration with the priming tank 4, sucking the electrolyte 8 in the priming tank 4 with the circulation pump 112 reduces gas-phase pressure in the priming tank 4 and causes the electrolyte 8 in the electrolyte tank 106 to be sucked up into the priming tank 4. With this configuration, initial suction of the electrolyte 8 stored in the electrolyte tank 106 only involves pouring the electrolyte 8 into the priming tank 4 and operating the circulation pump 112. The initial suction operation is thus carried out easily. In the configuration with the priming tank 4, a pipe that connects the pump body 3 to the priming tank 4 is preferably provided with a valve (not shown). For maintenance of the pump body 3, closing the valve is followed by removal of the pump body 3 from the circulation mechanism 100P.

The RF battery 1 illustrated in FIG. 4 is configured in such a manner that the electrolyte 8 is sucked up to above the electrolyte tank 106 (107). With this configuration, even if the suction pipe 5 running from the electrolyte tank 106 (107) to the circulation pump 112 (113) is damaged, the electrolyte 8 is less likely to leak out of the electrolyte tank 106 (107). This is because damage to the suction pipe 5 breaks hermeticity of the suction pipe 5 and allows gravity to cause the electrolyte 8 in the suction pipe 5 to return to the electrolyte tank 106 (107). The pump body 3 of the circulation pump 112 (113) of the present example is not immersed in the electrolyte 8, and this facilitates maintenance of the circulation pump 112 (113). This is because by simply stopping the circulation pump 112 (113), the electrolyte 8 in the suction pipe 5 is returned to the electrolyte tank 106 (107) and this saves the trouble of taking the impeller 30 (see FIG. 5) out of the electrolyte 8.

In the RF battery 1, the pump body 3 is disposed in the cell chamber 2 formed above the electrolyte tank 106. Therefore, even if the electrolyte 8 leaks near the pump body 3, the leaked electrolyte 8 can be easily kept inside the cell chamber 2. This facilitates treatment of the leaked electrolyte 8 and improves safety of the treatment.

In the RF battery 1 of the embodiment, the absolute value of the difference between $H_{L1}$ and $H_{L2}$ is greater than or equal to 0.4 times $H_0$ and both $H_{L1}$ and $H_{L2}$ are less than or equal to $H_d$, where $H_0$ is a height from the inner bottom surface of the electrolyte tank 106 to the in-tank liquid level of the electrolyte 8;

$H_{L1}$ is a length from the in-tank liquid level to an open end 50 of the suction pipe 5;

$H_{L2}$ is a length from the in-tank liquid level to an open end 70 of the return pipe 7 in a depth direction of the electrolyte 8 ($H_{L2}$ is defined as zero ($H_{L2}=0$ m) in the present example, where the return pipe 7 is open to the gas phase in the electrolyte tank 106); and $H_d$ is a distance from the in-tank liquid level to a center of a highest segment of the return pipe 7, the highest segment being located at the highest level of the return pipe 7.

When $H_{L1}-H_{L2} \geq 0.4H_0$ ($H_{L1} \geq 0.4H_0$ in the present example, where $H_{L2}=0$) is satisfied, the distance from the open end 70 of the return pipe 7 for discharging the electrolyte 8 circulated in the cell 100 to the open end 50 of the suction pipe 5 is long and this facilitates development of large convection in the electrolyte 8. The utilization ratio of the electrolyte 8 in the electrolyte tank 106 can thus be improved. To further improve the utilization ratio of the electrolyte 8, it is preferable that $H_{L1}-H_{L2} \geq 0.6H_0$ be satisfied, and that even $H_{L1}-H_{L2} \geq 0.8H_0$ or $H_{L1}-H_{L2} \geq 0.9H_0$ be satisfied.

The configuration that sucks up the electrolyte 8 tends to have a larger $H_d$, and this leads to increased pump power of the circulation pump 112. To reduce an increase in pump power, it is preferable to reduce friction loss in the suction pipe 5 and the return pipe 7 without reducing the utilization ratio of the electrolyte 8. Specifically, it is preferable to make $H_{L1}$ relating to the length of the suction pipe 5 and $H_{L2}$ relating to the length of the return pipe 7 less than or equal to the actual head $H_d$ so as to keep the pump power of the circulation pump 112 for sucking up and circulating the electrolyte 8 low. This makes it possible to reduce power consumption for operating the RF battery 1 and achieve efficient operation of the RF battery 1.

It is more preferable that $H_S$ be less than or equal to 0.4 times $H_d$ ($H_S \leq 0.4H_d$), where $H_S$ is a height (actual suction head) from the in-tank liquid level to the center of a suction port 32 of the circulation pump 112. This is because, as described above, NPSHa has a physical limitation and if $H_S$ is too high, NPSHa may decrease and fail to satisfy NPSHr<NPSHa. To further reduce a decrease in NPSHa, it is preferable that $H_S \leq 0.3H_d$ be satisfied and it is more preferable that $H_S \leq 0.2H_d$ be satisfied.

Second Embodiment

Figure 6:
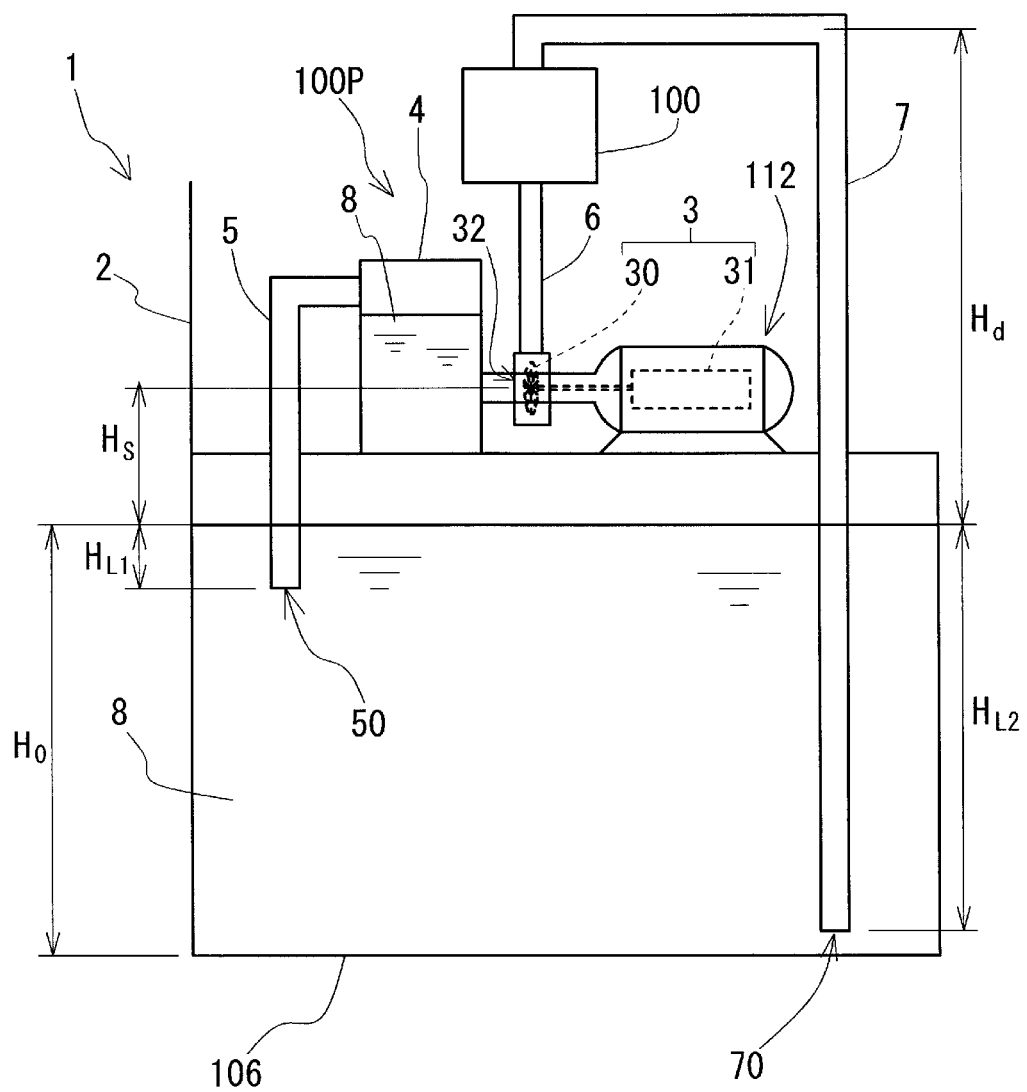
FIG. 6 is a schematic diagram of a circulation mechanism included in a redox flow battery according to a second embodiment.

In a second embodiment, the RF battery 1 is described on the basis of FIG. 6, in which the submerged length $H_{L2}$ of the return pipe 7 is longer than the submerged length $H_{L1}$ of the suction pipe 5. In FIG. 6, components having the same functions as those in FIG. 5 are denoted by the same reference numerals as those in FIG. 5.

In the second embodiment, satisfying $H_{L2} - H_{L1} \geq 0.4H_0$ promotes convection of the electrolyte 8 and increases the utilization ratio of the electrolyte 8. This is because a large difference in height between the open end 50 of the suction pipe 5 and the open end 70 of the return pipe 7 facilitates development of convection in the electrolyte 8. To further improve the utilization ratio of the electrolyte 8, it is preferable that $H_{L2} - H_{L1} \geq 0.6H_0$ be satisfied, and that even $H_{L2} - H_{L1} \geq 0.8H_0$ or $H_{L2} - H_{L1} \geq 0.9H_0$ be satisfied.

Since the configuration that sucks up the electrolyte 8 tends to have a larger $H_d$, both $H_{L1}$ and $H_{L2}$ are also made less than or equal to $H_d$ in the second embodiment.

To reduce a decrease in NPSHa, it is preferable that $H_S \leq 0.4H_d$ be satisfied and it is more preferable that $H_S \leq 0.3H_d$ or $H_S \leq 0.2H_d$ be satisfied.

CALCULATION EXAMPLE

The present calculation example calculates friction loss in the pipes 5 and 7 and NPSHa, in the configurations of the first and second embodiments using the circulation pump 112 with NPSHr=2 m, and examines the possibility of power reduction of the circulation pump 112.

Example 1

Example 1 shows a calculation example for the RF battery 1 of the first embodiment illustrated in FIG. 5. Preconditions for the calculation are as follows:
distance $H_d$ between the in-tank liquid level and the center of the pipe segment located at the highest level=3.0 m;
actual suction head $H_S$=0.5 m;
electrolyte depth $H_0$=2.8 m;
submerged length $H_{L1}$ of the suction pipe 5=2.7 m;
electrolyte flow rate Q=960 liters/minute; and
inside diameter D of the suction pipe 5=0.1 m.

In Example 1, where the liquid utilization height ratio $H_{L1}/H_0 \approx 0.96$, the efficiency of utilization of active material ions in the electrolyte is fully ensured. The liquid utilization height ratio is a measure of the utilization ratio of the electrolyte. In Example 1, where $H_d \geq H_{L1}$, $H_{L2}$ is satisfied, the pressure loss head (suction pipe loss) of the suction pipe 5 is 0.79 m and the pressure loss head of the extrusion pipe 6 and the return pipe 7 is 9.60 m. The latter pressure loss head is larger than the former pressure loss head, because a small-diameter pipe portion in the vicinity of the cell stack 200 has a larger pressure loss head. Additionally, $H_S \leq 0.4H_d$ is satisfied, and NPSHa is nearly equal to 8.71 m (NPSHa≈8.71 m) and satisfies NPSHr<NPSHa. The electrolyte can thus be circulated without problems.

Example 2

Example 2 shows a calculation example for the RF battery 1 of the second embodiment illustrated in FIG. 6. Preconditions in this example are the same as those in Example 1, except that the submerged length $H_{L1}$ of the suction pipe 5 is 0.1 m and the submerged length $H_{L2}$ of the return pipe 7 is 2.7 m. In this case, where the liquid utilization ratio $(H_{L2} - H_{L1})/H_0$ is nearly equal to 0.93 $((H_{L2} - H_{L1})/H_0 \approx 0.93)$, the efficiency of utilization of active material ions in the electrolyte is fully ensured. In Example 2, where $H_d \geq H_{L1}$, $H_{L2}$ is satisfied, the pressure loss head (suction pipe loss) of the suction pipe 5 is 0.67 m and the pressure loss head of the extrusion pipe 6 and the return pipe 7 is 9.73 m. The latter pressure loss head is larger than the former pressure loss head, because a small-diameter pipe portion in the vicinity of the cell stack 200 has a larger pressure loss head. Additionally, $H_S \leq 0.4H_d$ is satisfied, and NPSHa is nearly equal to 8.83 m (NPSHa≈8.83 m) and satisfies NPSHr<NPSHa. The electrolyte can thus be circulated without problems.

<<Overview>>

As in Examples 1 and 2, the configuration that sucks up the electrolyte 8 tends to have a larger pressure loss head in the circulation mechanism 100P. In particular, a portion including the cell 100 downstream of the circulation mechanism 100P tends to have a very large pressure loss head and the pump power of the circulation pump 112 tends to be large. Therefore, it is of significance to reduce the pump power of the circulation pump 112 by ensuring the liquid utilization height ratio and satisfying $H_d \geq H_{L1}$, $H_{L2}$. By satisfying $H_d \geq H_{L1}$, $H_{L2}$, the amount of power required for operating the RF battery 1 can be made smaller than in the case of $H_{L1}, H_{L2}, > H_d$ and more efficient operation of the RF battery 1 is ensured.

<Applications>

For power generation by new energy, such as solar photovoltaic energy or wind energy, the RF battery according to the embodiment can be used as a storage battery that aims, for example, to stabilize the output of power generation, store electricity when there is a surplus of generated power, and provide load leveling. The RF battery according to the present embodiment may be installed in a general power plant and used as a large-capacity storage battery system that aims to provide a measure against momentary voltage drops or power failure and to provide load leveling.

REFERENCE SIGNS LIST

1: redox flow battery (RF battery)
2: cell chamber
3: pump body

30: impeller, 31: driving unit, 32: suction port, 33: discharge port
4: priming tank
5: suction pipe, 50: open end
6: extrusion pipe
7: return pipe, 70: open end
8: electrolyte
9: power system, 90: transformer facility, 91: power converter
100: cell, 101: membrane, 102: positive electrode cell, 103: negative electrode cell
  100P: positive electrolyte circulation mechanism, 100N: negative electrolyte circulation mechanism
  104: positive electrode, 105: negative electrode, 106: positive electrolyte tank
  107: negative electrolyte tank, 108, 109, 110, 111: duct
  112, 113: circulation pump
  120: cell frame
  121: bipolar plate, 122: frame body
  123, 124: liquid supply manifold, 125, 126: liquid discharge manifold
  123s, 124s: inlet slit, 125s, 126s: outlet slit
  127: ring-shaped sealing member
200: cell stack
  190: supply/discharge plate, 200s: substack
  210, 220: end plate
  230: fastening mechanism

The invention claimed is:

1. A redox flow battery comprising a cell, an electrolyte tank configured to store an electrolyte supplied to the cell, and a circulation mechanism disposed between the cell and the electrolyte tank and configured to circulate the electrolyte,
wherein the circulation mechanism includes
a suction pipe configured to suck up the electrolyte from an open end thereof in the electrolyte to above an in-tank liquid level of the electrolyte in the electrolyte tank,
a circulation pump disposed at an end portion of the suction pipe,
an extrusion pipe running from a discharge port of the circulation pump to the cell, and
a return pipe running from the cell to the electrolyte tank; and
an absolute value of a difference between HL1 and HL2 is greater than or equal to 0.4 times H0 and both HL1 and HL2 are less than or equal to Hd, where H0 is a height from an inner bottom surface of the electrolyte tank to the in-tank liquid level, HL1 is a length from the in-tank liquid level to the open end of the suction pipe, HL2 is a length from the in-tank liquid level to an open end of the return pipe in a depth direction of the electrolyte, and Hd is a distance from the in-tank liquid level to a center of a highest segment of the return pipe, the highest segment being located at the highest level of the return pipe, and wherein if the open end of the return pipe is located above the in-tank liquid level, the difference between HL1 and HL2 is HL1.

2. The redox flow battery according to claim 1, wherein $H_S$ is less than or equal to 0.4 times $H_d$, where $H_S$ is a height from the in-tank liquid level to a center of a suction port of the circulation pump.

3. The redox flow battery according to claim 1 or 2, wherein the circulation pump is a self-priming pump having a pump body including an impeller and a driving unit configured to rotate the impeller; and
the pump body is disposed above the in-tank liquid level.

4. The redox flow battery according to claim 3, wherein the circulation pump is provided with a priming tank disposed between the pump body and the suction pipe.

5. The redox flow battery according to claim 3, further comprising a cell chamber disposed on an upper surface of the electrolyte tank and containing the cell therein,
wherein the pump body is disposed in the cell chamber.

* * * * *

UNITED STATES PATENT AND TRADEMARK OFFICE
CERTIFICATE OF CORRECTION

PATENT NO. : 10,644,333 B2
APPLICATION NO. : 16/080427
DATED : May 5, 2020
INVENTOR(S) : Atsuo Ikeuchi Page 1 of 1

It is certified that error appears in the above-identified patent and that said Letters Patent is hereby corrected as shown below:

In the Claims

In the Claim 3, Column 12, Line 25, "according to claim 1 or 2" should read --according to claim 1--.

Signed and Sealed this
Twenty-seventh Day of October, 2020

Andrei Iancu
*Director of the United States Patent and Trademark Office*